United States Patent
Janz et al.

(10) Patent No.: US 9,148,341 B2
(45) Date of Patent: Sep. 29, 2015

(54) UPGRADING A PROGRAMMABLE LOGIC GATE ARRAY IN AN IN-SERVICE PLUGGABLE TRANSCEIVER

(71) Applicant: JDS Uniphase Corporation, Milpitas, CA (US)

(72) Inventors: Emmanuelle Marie Josèphe Janz, Dunrobin (CA); Luc Chouinard, Ottawa (CA); David George Coomber, Nepean (CA)

(73) Assignee: JDS UNIPHASE CORPORATION, Milpitas, CA (US)

( * ) Notice: Subject to any disclaimer, the term of this patent is extended or adjusted under 35 U.S.C. 154(b) by 359 days.

(21) Appl. No.: 13/850,422

(22) Filed: Mar. 26, 2013

(65) Prior Publication Data

US 2013/0250813 A1    Sep. 26, 2013

Related U.S. Application Data

(60) Provisional application No. 61/615,536, filed on Mar. 26, 2012.

(51) Int. Cl.
*H04L 12/24* (2006.01)
*H04L 12/939* (2013.01)
*H04L 12/56* (2006.01)

(52) U.S. Cl.
CPC .......... *H04L 41/0809* (2013.01); *H04L 41/082* (2013.01); *H04L 49/555* (2013.01)

(58) Field of Classification Search
CPC .................. G06F 17/5027; G01R 31/318519; H04B 10/40; H04B 10/291
USPC .................................. 370/235, 401; 345/520
See application file for complete search history.

(56) References Cited

U.S. PATENT DOCUMENTS

| | | | |
|---|---|---|---|
| 7,242,867 B1 * | 7/2007 | Clouinard | 398/52 |
| 7,580,637 B2 * | 8/2009 | El-Ahmadi et al. | 398/135 |
| 8,345,703 B2 | 1/2013 | Heinkel et al. | 370/419 |
| 2005/0149651 A1 * | 7/2005 | Doak et al. | 710/52 |
| 2008/0232269 A1 * | 9/2008 | Tatman et al. | 370/252 |
| 2008/0263319 A1 * | 10/2008 | Snyder et al. | 712/29 |

FOREIGN PATENT DOCUMENTS

WO    2008/041978    4/2008    ............. G06F 15/78

OTHER PUBLICATIONS

"Smart SFP™ simplifies operations and maintenance for network operators" OE Solutions & AimValley Feb. 28, 2012.
"AN 603: Active Serial Remote System Upgrade Reference Design" ALTERA Apr. 2010.

(Continued)

*Primary Examiner* — Charles C Jiang
*Assistant Examiner* — Will Lin
(74) *Attorney, Agent, or Firm* — Mannava & Kang, P.C.

(57) ABSTRACT

Devices and methods for partially upgrading a programmable pluggable transceiver that is in service using the regular datapaths without degrading the basic transparent, hitless pass-through functionality of the transceiver. The programmable logic gate array can be divided into four generalized parts: core logic for basic transceiver pass-through functionality over the datapaths, upgradeable internal logic, connectivity logic for selectively outputting on the datapaths from the core and internal logics, and control logic for isolating, upgrading and reconnecting the internal logic without affecting the basic transparent hitless pass-through functionality of the transceiver.

20 Claims, 4 Drawing Sheets

(56) References Cited

OTHER PUBLICATIONS

"Cyclone V Device Handbook vol. 1: Device Overview and Datasheet" ALTERA Feb. 2012.

"8. Configuration and Remote system Upgrades in Cyclone IV Devices" ALTERA Nov. 2011.

"White Paper: Accedian EtherNID™ and QT-600 Ensuring Quality of Service on Carrier-Grade Ethernet Networks" Accedian Networks Version 1.5 (May 18, 2007).

"MEF Introduction to Ethernet Services" Rafael Francis ECI Telecom, Dec. 2008.

"MEF Technical Specification MEF x.0 Latching Loopback Protocol and Functionality" The Metro Ethernet Forum created 2009; amendments 2012.

"Remote system Upgrades with Stratix Series FPGAs" ALTERA, Website accessed and document downloaded May 10, 2013.

* cited by examiner

UPGRADING A PROGRAMMABLE LOGIC GATE ARRAY IN AN IN-SERVICE PLUGGABLE TRANSCEIVER

CROSS-REFERENCE TO RELATED APPLICATIONS

The present disclosure claims priority from U.S. Provisional Patent Application No. 61/615,536 filed Mar. 26, 2012, entitled "Hitless, Secure & In-Band Functionality Upgrading for an In-Field In-Service Pluggable Transceiver", which is incorporated herein by reference for all purposes.

TECHNICAL FIELD

The present invention relates to pluggable transceivers having programmable logic gate arrays in communication networks and more particularly to in-service upgrade functionality of a programmable logic gate array pluggable transceiver using in-band or two-wire interface datapaths while in service and with minimal or no affects on service traffic.

BACKGROUND OF THE INVENTION

Communication Service Providers are deploying a large number of Ethernet and IP services across networks and across a large number of Network Equipment Manufacturers (NEMs).

Network Elements (NEs) in today's networks are owned and managed by many parties that have interests in different portions of the Ethernet networks. To support the different needs of these parties, different types of services are being deployed over these networks.

The support for Ethernet performance monitoring, test and turn-up functions differs largely from one network equipment provider to another and this increases the operation complexity of deploying Ethernet based services across networks and across equipment vendors. The required capabilities are not always supported on all networking elements. And when supported, these capabilities may not be implemented consistently across different equipment vendors making it hard to manage with a single network management system.

Many networking elements (NEs) have pluggable transceiver ports. The pluggable transceivers inserted therein can be SFPs, XFPs, SFP+, CFPs, an so on. The basic functionality of a pluggable transceiver is to forward traffic between two interfaces in both directions. Traditional pluggable transceivers are very small (e.g. small form-factor) and perform very limited functionality but have the advantage of being part of most existing networking equipment by most network equipment manufacturers. Pluggable transceivers are pluggable in the sense that they are easily replaceable components that have a common and widely accepted physical interface on network equipment. Small form-factor pluggables (SFPs) are a popular industry format jointly developed and supported by many network equipment manufacturers and vendors. Enhanced small form-factor pluggable (SPF+) supports data rates up to 10 Gbit/s.

Pluggable transceivers provide input and output interfaces between network elements like switches, routers, etc. and fiber optic or electrical cables. Some of these interfaces perform conversions between optical and electrical signals. Small form-factor pluggable (SFP) transceivers support communications standards including synchronous optical networking (SONET), synchronous digital hierarchy (SDH), gigabit Ethernet and fiber channel. They also allow the transport of fast Ethernet and gigabit Ethernet LAN packets over time-division-multiplexing-based WANs, as well as the transmission of E1/T1 streams over packet-switched networks. Other interfaces are purely electrical, for example copper SFPs that do not contain an optical-electrical conversion or use fiber optic cables.

Pluggable transceivers typically follow a very detailed specification defined under industry MSAs (MultiSource Agreements). Pluggable transceivers are globally accepted by the networking community. Their small mechanical form factor and their simple interfaces are well defined. Furthermore, programmable gate arrays such as FPGAs have decreased in physical requirements sufficiently that they can be included within a pluggable transceiver without increasing their physical size and without substantially changing the throughput, power and heat dissipation requirements.

By adding programmable logic gate devices on these pluggable transceivers, they become programmable pluggable transceivers. By installing programmable pluggable transceivers in NEs, monitoring and networking functions can be added directly at the interfaces of these NEs, providing a cost effective and unified way to add these functionalities onto existing network elements as illustrated in FIG. 1.

FIG. 1 illustrates a series of Network Elements (NEs) 2, 4, 6 each having programmable pluggable transceivers 8 connected in a segment of a communication network 100. The NEs may be heterogeneous because some NEs may be provided by some manufacturers, and some by others. In FIG. 1, NEs 2, 4, 6 are connected in the network 100 such as by fiber optical or electrical cabling providing datapaths 16, 18, 20, 22. The NEs 2, 4, 6 have ports to receive pluggable transceivers 8 which provide interfaces between NEs 2, 4, 6 over the datapaths 16, 18, 20, 22 of the network 100. Any number of ports may exist on an NE 2, 4, 6 and not all ports require a transceiver or a programmable pluggable transceiver 8. The datapaths 16, 18, 20, 22 include service traffic datapaths, host 2-wire interface datapaths, and i$^2$C bus datapaths (i$^2$C is trade-mark of NXP Semiconductor). The datapaths may transmit frames including serial data streams.

The basic pass-through functionality of a transceiver 8 is to pass service traffic data through the transceiver in a transparent and hitless manner. This requires converting, if necessary, signals from the line-side where data is sent and received over fiber optic or electrical cabling to host-side where data is sent and received between the transceiver 8 and a network element 2, 4, 6 into which the transceiver 8 is plugged. Generally, transparent and hitless transmission implies transmission through the transceiver cannot be detected by other devices handling the service traffic data. The transceiver handles the data without dropping, corrupting or unintentionally changing it at the full line rate or minimum throughput rate of the network. One exception to the transparent and hitless functionality is that some transceivers are designed to make minor changes to the signal traffic data, such as changing the frame encapsulation without affecting the payload.

The pluggable transceivers 8 are programmable pluggable transceivers because they include a programmable logic gate array 10 within the transceiver. One such programmable pluggable transceiver 8' is enlarged in FIG. 1 to show greater detail. Typically, the programmable logic gate array 10 is disposed between the line interface 12 and the host interface 14 such that the logic gate array 10 intersects both datapaths 16, 18 through the transceiver 8'. The logic gate array 10 may comprise any programmable logic gate array, for example FPGA, FPLA, PLA, CPLD, programmable ICs and so on.

The commonly known functionality of logic gate arrays such as FPGAs to be re-programmed and upgraded permits changing the functionality embedded in a programmable pluggable transceiver's logic gate array. Remote upgrade and partial reconfiguration capabilities are already available in certain logic device families, including FPGAs. Remote Upgrade allows the logic gate array to be upgraded in situ from a remote location. Partial Reconfiguration allows reconfiguring a portion of a logic gate array while other portions of the logic gate array remain operational and unchanged during the upgrade. Logic partitioning may be applied when performing partial reconfiguration of logic gate arrays to segregate the functionality that is being upgraded. Logic partitioning segments the contents of the logic gate array into distinct sections. A logic gate array may be partitioned based on contiguously addressed physical blocks of the array, or it may be partitioned non-contiguously and additional logic manages which blocks are associated with which partitions.

Because the logic gate array 10 is programmable, the programmable pluggable transceiver 8 may be programmed for any functionalities and has the potential to be upgraded for any number of reasons. For example: supporting new protocols, patch implementation to fix bugs, supporting a wide range of functionalities that cannot all concurrently reside in the logic gate array (for example, due to FPGA size restrictions), upgrading many transceivers to the same version across a network, customer and/or application specific functionalities, and so on.

Upgrading the logic gate array 10 may be achieved by removing the programmable pluggable transceiver from service and installing it into custom hardware for performing upgrades to the logic gate array 10. Upgrading may also be achieved while the programmable pluggable transceiver 8 is plugged into an NE 2, 4, 6 by disabling the transceiver and applying upgrades remotely. Unfortunately, both of these upgrade methods are service affecting. They are service affecting because the programmable pluggable transceiver 8 cannot perform its basic data forwarding and conversion functionality while such upgrade methods are applied to the functionality in the logic gate array. It would be advantageous to be able to upgrade a programmable pluggable transceiver while the transceiver is in service and without or with only minimally affecting the transceiver's through traffic.

SUMMARY OF THE INVENTION

The present disclosure describes how to upgrade functionality within the logic gate array of a programmable pluggable transceiver that is in service using the regular datapath without degrading the basic hitless pass-through functionality of the transceiver.

According to one aspect, a programmable pluggable transceiver for use in a network element of a network is provided. The transceiver comprises a datapath for relaying frames through the transceiver, a memory for storing upgrade data and a programmable logic gate array connected through the datapath, connected to the memory, and comprising internal logic, core logic, connectivity logic and control logic. The internal logic is partitioned from the core logic, connectivity logic and control logic in the programmable logic gate array for upgrading the internal logic while the core logic, control logic and connectivity logic remain operational. The internal logic, core logic, and control logic are each connected to the datapath for receiving and processing different frames. The internal logic is connected to the connectivity logic via the control logic for, except during a partial upgrade, sending frames on the datapath and sending selection signals to the connectivity logic. The core logic is connected to the connectivity logic for forwarding frames on the datapath in accordance with a minimum throughput requirement. The connectivity logic is connected to the core logic and the control logic for receiving frames on the datapath and sending those frames on the datapath in accordance with the selection signal received from the control logic. The control logic is connected to the internal logic for receiving frames and selection signals from the internal logic. The control logic is connected to the connectivity logic for sending frames and selection signals received from the internal logic, except during a partial upgrade. The control logic, in response to receiving a frame on the datapath containing upgrade data, sends the upgrade data to the memory. The control logic, in response to receiving a frame on the datapath containing a partial upgrade command: blocks the internal logic from sending frames or selection signals to the connectivity logic before and during the partial upgrade, triggers upgrading of the internal logic from upgrade data in the memory while the core logic, connectivity logic and control logic remain operational during the partial upgrade, and unblocks the internal logic from sending frames or selection signals to the connectivity logic after the partial upgrade.

According to another aspect, a method for partially upgrading a programmable pluggable transceiver in service in a network is provided. The transceiver has a datapath for relaying frames through the transceiver, a programmable logic gate array connected through the datapath and a memory connected to the programmable logic gate array. The programmable logic gate array includes upgradeable internal logic, core logic, connectivity logic and control logic. The internal logic, core logic and control logic are connected to the datapath for receiving and processing different frames. The core logic and control logic are each connected to the connectivity logic for sending frames to be sent on the datapath. The connectivity logic receives frames from the core logic and the control logic on the datapath and sends those frame on the datapath in accordance with a selection signal from the control logic. The core logic forwards frames on the datapath in accordance with a minimum throughput requirement. The internal logic is connected to the control logic for forwarding frames and selection signals to the connectivity logic, except during a partial upgrade. The control logic isolates and upgrades the internal logic while the core logic, connectivity logic and control logic remain operational during the partial upgrade. The method comprises partitioning the internal logic separately from the core logic, connectivity logic and control logic for upgrading the internal logic while the core logic, control logic and connectivity logic remain operational in service. The method includes providing upgrade data in the memory; and receiving, in the control logic, a frame containing a partial upgrade command. In response to the partial upgrade command, the control logic: blocks the internal logic from sending frames or selection signals to the connectivity logic; and after the blocking, triggers reprogramming of the internal logic from the upgrade data in the memory while the core logic, connectivity logic and control logic remain operational; and after the reprogramming, unblocks the internal logic from sending frames or selection signals to the connectivity logic.

In further aspects of the present disclosure, the core logic and the connectivity logic relay frames through the transceiver on the datapath while the control logic responds to the partial upgrade command. The control logic comprises logic gates and mask signals for blocking the frames and selection signals from the internal logic thereby blocking the internal logic's frames and selection signals from reaching the connectivity logic.

In yet further aspects of the present disclosure, in response to receiving a frame containing a partial upgrade command, the control logic determines if the internal logic is inserting frames on the datapath, and if so, concludes inserting frames before the blocking. Concluding inserting frames comprises any of waiting for an idle period after the currently inserting frames, waiting for the currently inserting frames to complete insertion, and aborting the currently inserting frames by invalidating a checksum of the current frame and stopping further frame insertion.

In response to receiving a frame containing a partial upgrade command, further aspects of the present disclosure may authenticate the partial upgrade command before upgrading the internal logic. In response to receiving a frame containing upgrade data, further aspects of the present disclosure may include logic for verifying an encryption of the frame containing upgrade data before sending the upgrade data to the memory.

In still further aspects of the present disclosure, a second datapath for relaying frames through the transceiver is provided and the internal logic includes loopback logic for filtering frames from one of the datapath and the second datapath and sending the frames back on the other of the datapath and the second datapath. Unblocking the internal logic from sending frames or selection signals to the connectivity logic further comprises re-enabling looping back in the internal logic and re-enabling frame inserting in the internal logic.

Where alternative embodiments and additional aspects of those embodiments are described in the present disclosure, these embodiments and aspects may be combined in any manner within a single embodiment unless the present disclosure suggests otherwise. While preferred embodiments may be illustrated or described herein, they are not intended to limit the invention. Rather, numerous changes including alternatives, modifications and equivalents may be made as would be understood by the person skilled in the art.

BRIEF DESCRIPTION OF THE DRAWINGS

The invention will be described in greater detail with reference to the accompanying drawings.

DETAILED DESCRIPTION

Figure 1:
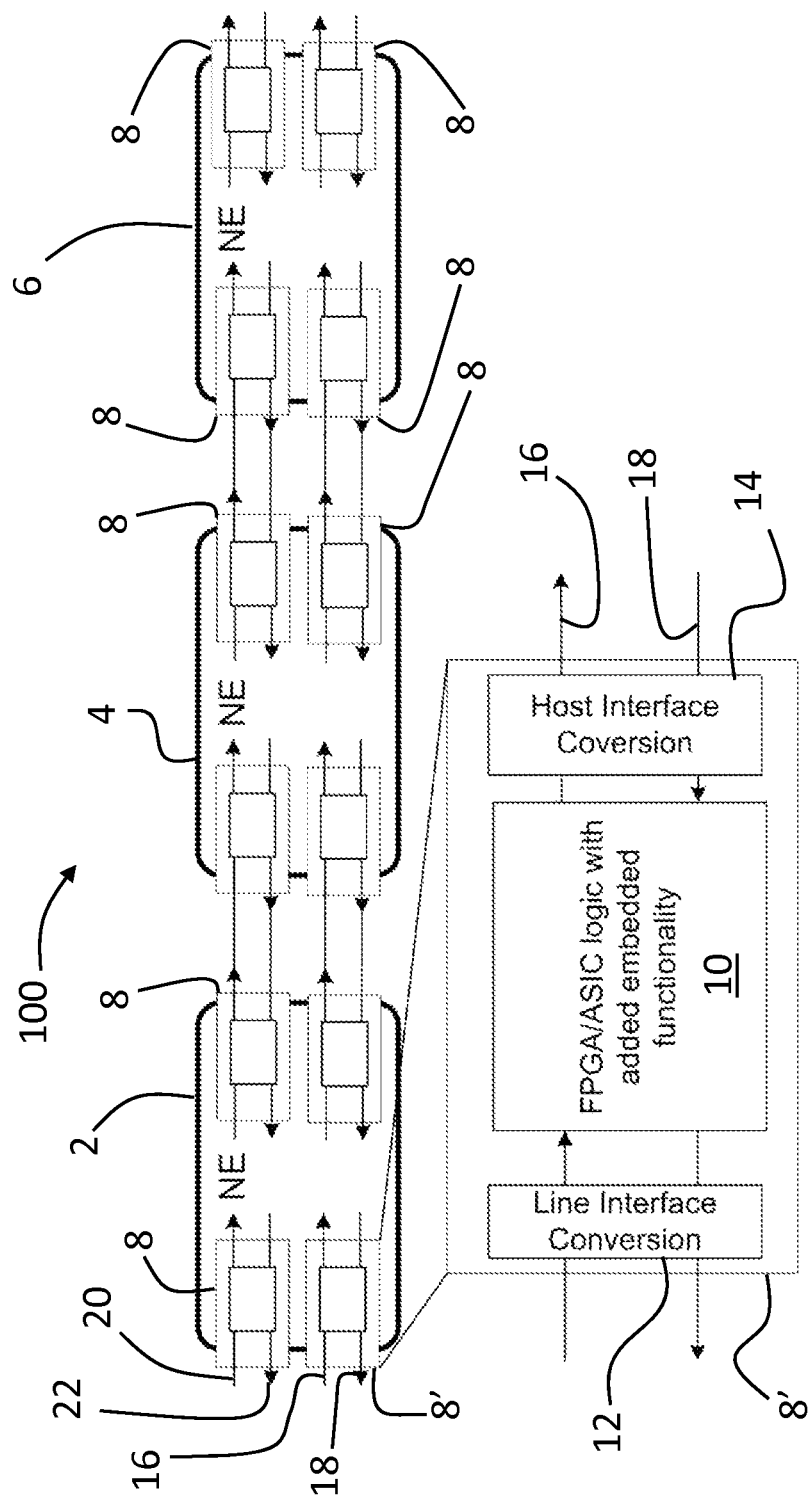
FIG. 1 is logical block diagram of a prior art network segment illustrating programmable pluggable transceivers.
Figure 2:
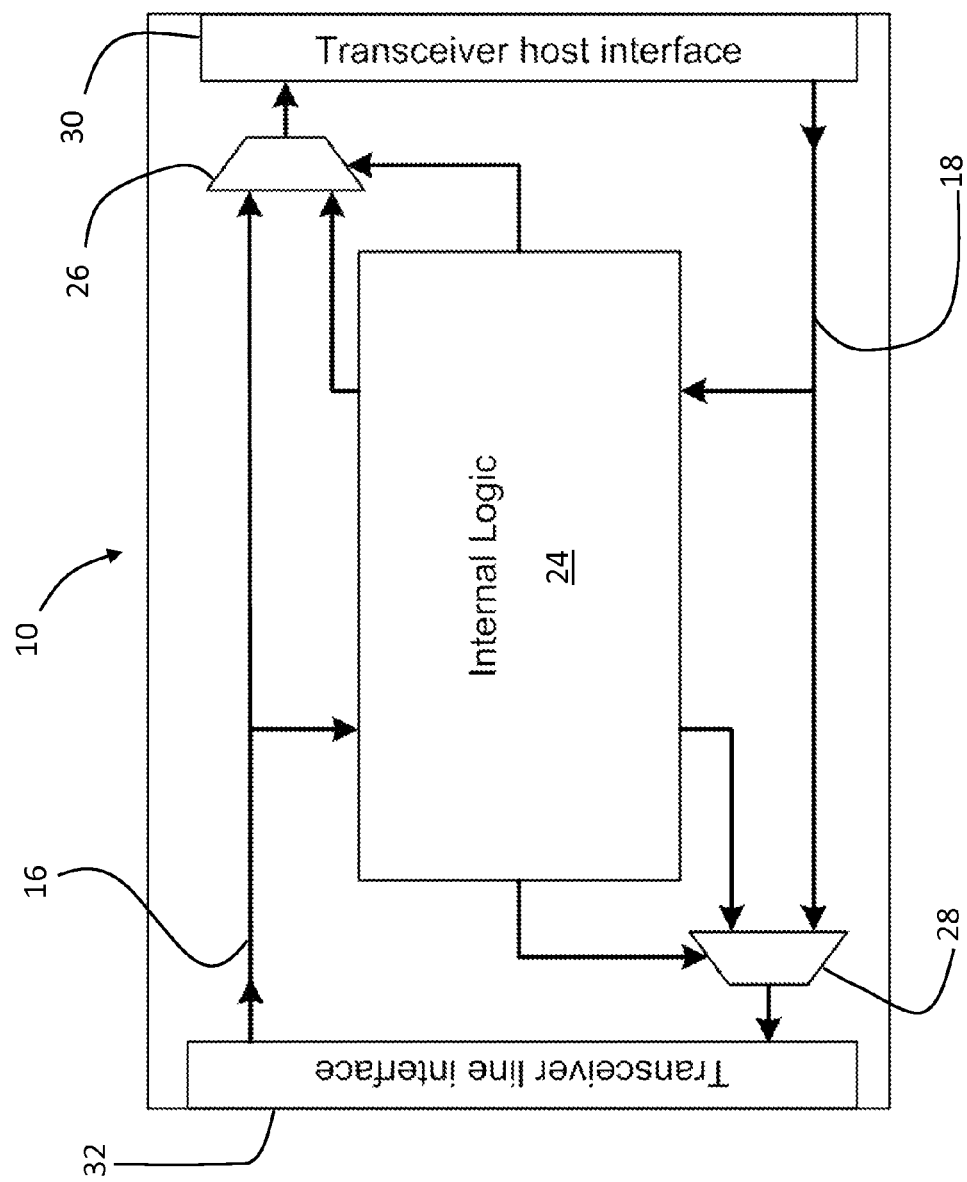
FIG. 2 is a logical block diagram of a programmable logic gate array of a prior art programmable pluggable transceiver.

Referring now to FIG. 2, a logic gate array 10 of a programmable pluggable transceiver is illustrated. The internal logic 24 of the logic gate array 10 allows the transceiver to insert new frames or loopback, filter, process and/or terminate incoming traffic frames on either datapath 16, 18. Multiplexer logic 26, 28 intersects each datapath 16, 18 respectively. Each multiplexer logic 26, 28 may receive frames from internal logic 24 to be inserted into the datapaths 16, 18 for example during idle periods in traffic. Selection of which source the multiplexer logic 26, 28 passes through the datapath 16, 18 is controlled by internal logic 24.

The internal logic 24 can inspect incoming frames on either datapath 16, 18 for filtering, looping-back, processing and/or terminating incoming frames. The internal logic 24 can also generate control frames, or any other new frames, which are inserted in between regular traffic frames in either datapath 16, 18 as shown in FIG. 2. Frame buffering and scheduling logic within the internal logic 24 may handle hitless transitions between frames from different sources. Multiplexer logic 26, 28 controlled by internal logic 24 manage the insertion of frames from the internal logic 24 into the datapaths 16, 18 and ultimately through the transceiver host interface 30 or transceiver line interface 32 respectively.

The transceiver host interface 30 and transceiver line interface 32 interface data between the logic gate array 10 and the rest of the transceiver 8. These interfaces 30, 32 may perform data conversions, if any are necessary between the transceiver and the logic gate array 10.

The logic gate array 10 illustrated in FIG. 2 can be divided into three parts: internal logic 24, core logic and connectivity logic. As above, internal logic can be any functionality that one could desire in a programmable pluggable transceiver. Core logic performs the basic hitless pass-through functionality of a transceiver. Core logic comprises the transceiver host interface 30 and the transceiver line interface 32. Connectivity logic combines the outgoing data from the two other parts onto datapaths 16, 18. In FIG. 2, connectivity logic comprises the multiplexor logic 26, 28 but is controlled by the internal logic 24.

U.S. patent application Ser. No. 13/783,871 owned by the Applicant, filed Mar. 4, 2013, entitled "Layer 2 And 3 Latching Loopbacks on a Pluggable Transceiver", and incorporated herein by reference, provides an example application of programmable pluggable transceivers in communication networks.

It would be advantageous for a programmable pluggable transceiver such as the one suggested in FIG. 2 to be upgradeable using existing traffic datapaths (in-band) with minimal effect, or without effecting, traffic and be secure to prevent erroneous, unintentional or malicious upgrades. The present disclosure describes how to upgrade the internal logic of the programmable logic gate array of a programmable pluggable transceiver while the programmable pluggable transceiver remains in service using existing datapaths and without degrading the basic hitless pass-through functionality of the core logic of the transceiver.

Figure 3:
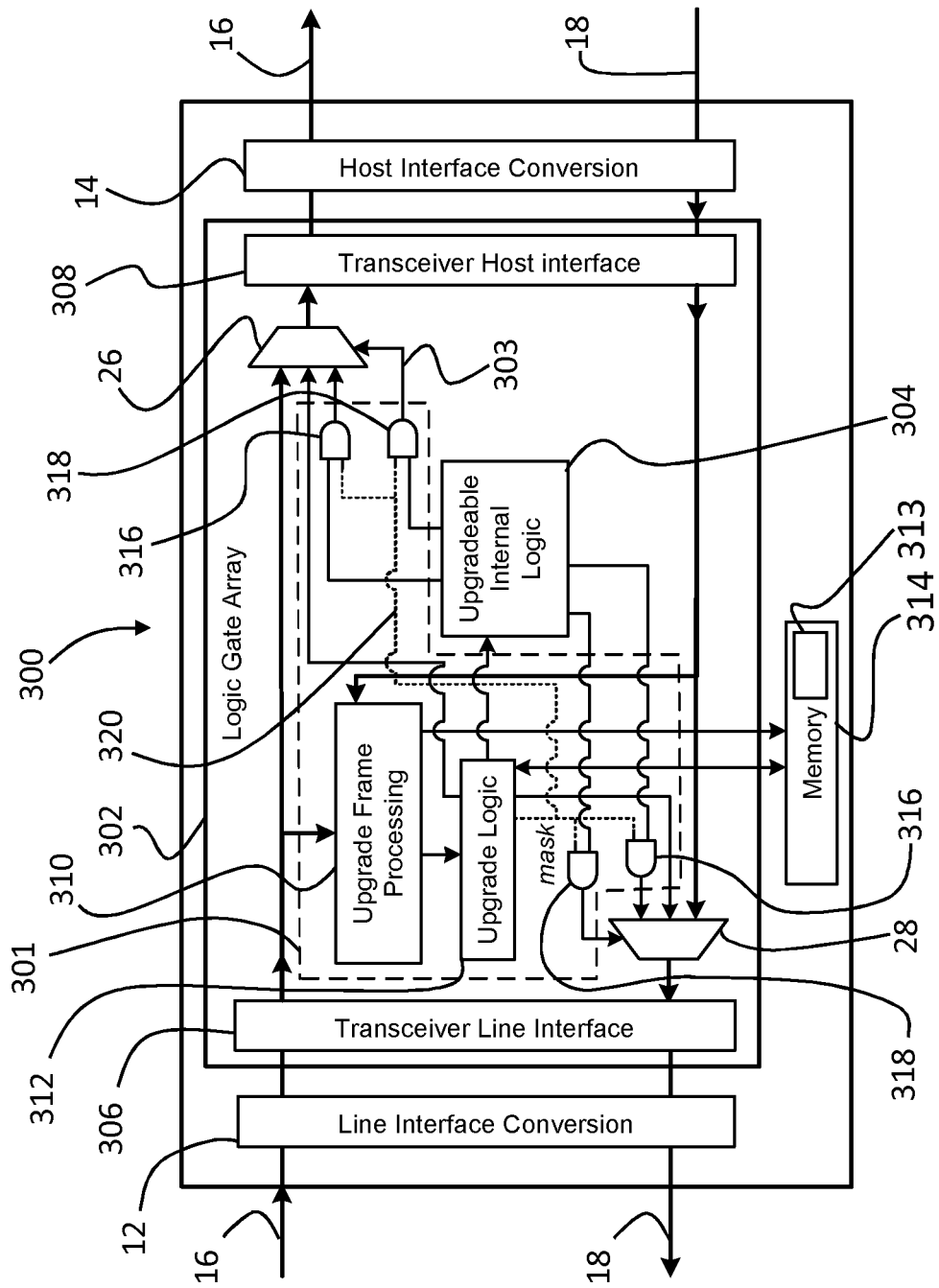
FIG. 3 is a logical block diagram of a partially-upgradeable programmable pluggable transceiver according to the present disclosure.

Referring now to FIG. 3, a programmable pluggable transceiver 300 is illustrated. The transceiver 300 includes datapaths 16, 18 for relaying frames in a packet based network (or other data in any network) in both directions through the transceiver 300, a line interface conversion 12 for performing optical to electrical or electrical to electrical conversions of data on datapaths 16, 18 and a host interface conversion 14 for performing any necessary conversions of data on datapaths 16, 18 between the transceiver 300 and a network element 2, 4, 6 into which the transceiver is plugged. Each of these components has been previously described and is well understood in the art. The transceiver 300 further includes a programmable logic gate array 302 intersecting both datapaths 16, 18 between the line interface conversion 12 and the host interface conversion 14. The datapaths 16, 18 may include host two-wire interface datapaths which may not necessarily pass through the transceiver line interface 306 or transceiver host interface 308 as these serial datapaths are separate physical connections in the transceiver 300 for a host port connection.

Different from the transceiver of FIG. 2, the logic gate array 302 may be divided into four parts: the Upgradeable Internal Logic 304, core logic, connectivity logic 26, 28 and control logic 301. Each of these parts is described below.

The Upgradeable Internal Logic 304 can receive data from both datapaths 16, 18, and can send data over both datapaths 16, 18 through the control logic 301 and the connectivity logic 26, 28. The Upgradeable Internal Logic 304 can signal the connectivity logic 26, 28 through the control logic 301 as to whether to select output from the core logic or the Upgradeable Internal Logic 304 for the datapaths 16, 18. Otherwise, the Upgradeable Internal Logic 304 may perform any functions that can be coded into its associated reprogrammable gates of the logic gate array 302.

Similar to FIG. 2, the core logic of the transceiver 300 enables basic transceiver functionality which is to pass-through data in a transparent, hitless manner on the datapaths 16, 18 performing any data conversions, if necessary, while maintaining any minimum throughput requirements for the transceiver. The basic pass-through functionality of the core logic would not be changed during a partial upgrade according to the present disclosure to ensure that the transceiver 300 would continue to operate in service during the upgrade.

Core logic comprises the transceiver line interface 306, transceiver host interface 308 and the datapaths 16, 18 connecting through these two interfaces. Data received on datapath 16 after line interface conversion 12 passes into the logic gate array 302 through transceiver line interface 306, along datapath 16, out the logic gate array 302 through transceiver host interface 308, through host interface conversion 14 and out the transceiver 300. The opposite order of operations occurs with data received on datapath 18. In operation, whether or not a partial upgrade is occurring, the basic transceiver functionality of the core logic allows the programmable pluggable transceiver 300 to operate as any commonly known pluggable transceiver. If a full upgrade of the logic gate array 302 is performed, the core logic is affected, thus a full upgrade of the transceiver's logic gate array 302 may still be service effecting on the transceiver 300.

The connectivity logic 26, 28 is the third part of the logic gate array 302 of the transceiver 300. The connectivity logic is provided for receiving frames from the Upgradeable Internal Logic 304, the core logic and the control logic 301 on either of the first and second datapaths and for sending the received frames on the corresponding datapaths in accordance with selection signals received from the control logic 301. In FIG. 3, the connectivity logic comprises the multiplexer logic 26, 28 as described in FIG. 2. Other logic structures for selecting between multiple sources to output may be equally applied to the connectivity logic. The connectivity logic may also ensure that a transition from outputting data from one source completes transmitting all frames of the data prior to switching to output data from another source. For example, if a service traffic datum comprising twenty frames is in the midst of being forwarded on datapath 16 when the Upgradeable Internal Logic 304 changes the selection signal to the multiplexer logic 26 indicating the Upgradeable Internal Logic 304 wants to transmit a datum, the multiplexer logic 26 could wait until all twenty frames of the service traffic datum were transmitted on datapath 16 prior to switching to output the Upgradeable Internal Logic datum. This ensures that the transceiver 300 would not affect service traffic data.

The control logic 301 is the last part of the logic gate array of the transceiver 300. This control logic is absent from FIG. 2 and prior art programmable pluggable transceivers. In FIG. 3, components of the control logic are illustrated within the thick-dashed-line region 301. The control logic 301 receives frames on the first and second datapaths 16, 18, receives frames from the Upgradeable Internal Logic 304, manages upgrading the Upgradeable Internal Logic 304, sends frame to the connectivity logic 26, 28 on either of the first and second datapaths 16, 18 and sends selection signals 303 to the connectivity logic 26, 28 for controlling which frames received by the connectivity logic 26, 28 should be output on the first or second datapaths 16, 18.

In response to the control logic 301 receiving a frame that contains upgrade data, the control logic 301 stores the upgrade data in the memory. In some embodiments, upgrade data may be discarded and re-downloaded if, for example, the CRC checksum, decryption or authentication measures fail. CRC checksum, decryption and authentication logic may be provided in the Upgrade Logic 312. These additional logic components may be part of verifying the authenticity of a partial upgrade command and/or upgrade data 313 before upgrading the Upgradeable Internal Logic 304 or part of verifying the encryption of frames containing portions of the upgrade data 313 to be stored in the memory 314. The logic gate array 302 may provide additional verification logic for verifying the entire upgrade data 313 prior to performing an upgrade.

In response to the control logic 301 receiving a frame that is a partial upgrade command, the control logic disconnects the internal logic from the connectivity logic, then reprograms the internal logic from upgrade data 313 in the External Memory 314 while the core logic remains running, then reconnects the reprogrammed Upgradeable Internal Logic 304 to the connectivity logic.

The control logic manages isolating the Upgradeable Internal Logic 304 from the core logic and upgrading the Upgradeable Internal Logic 304 while the core logic remains operational and unchanged. In the embodiment illustrated in FIG. 3, the control logic 301 comprises Upgrade Frame Processing 310, Upgrade Logic 312, selection signals 303 and isolation logic which, in FIG. 3, comprises logic gates 316, 318 and an associated mask signal 320 from the upgrade logic 312. In other embodiments, isolation logic may comprise more complex masking/unmasking logic like multiple gates, multi-step state machines, buffer flushing and disabling, etc. in order to disable any control, status or data signals originating from the Upgradeable Internal Logic 304.

The control logic 301 ensures seamless transitions in the logic gate array 302 when the Upgradeable Internal Logic 304 is disabled and enabled. Accordingly, a mask signal 320 overrides the operations of the Upgradeable Internal Logic 304 sending data or selection signals 303 to the multiplexer logic 26, 28.

In operation when a partial upgrade is occurring, the control logic 301 isolates the Upgradeable Internal Logic 304 from the core logic so that the reprogramming of the Upgradeable Internal Logic 304, whether successful or not, does not affect the basic transceiver functionality in the core logic. Isolation can be achieved through the logic gates 316, 318 and mask signal 320. For example, if the logic gates 316 are simple AND gates, a zero-value mask signal 320 can block any data (spurious during upgrade or otherwise) from the Upgradeable Internal Logic 304. The mask signal 320 may be differently interpreted for the logic gates 318 which may force the selection signals 303 to each multiplexer 26, 28 into a pass-through mode where the connectivity logic 26, 28 always outputs frames of the core logic, or the mask signal 320 and the logic gates 316 may force the selection signals 303 to prevent selecting to output frames from the Upgradeable Internal Logic 304.

In operation when a full upgrade is occurring, the control logic may also be upgraded, consequently the full upgrade is service effecting.

In operation when upgrades are not occurring, the control logic 301 acts passively permitting control of the multiplexer logic 26, 28 to be managed by the Upgradeable Internal Logic 304 and permitting data from the Upgradeable Internal Logic 304 to pass through logic gates 316 unimpeded.

Figure 4:
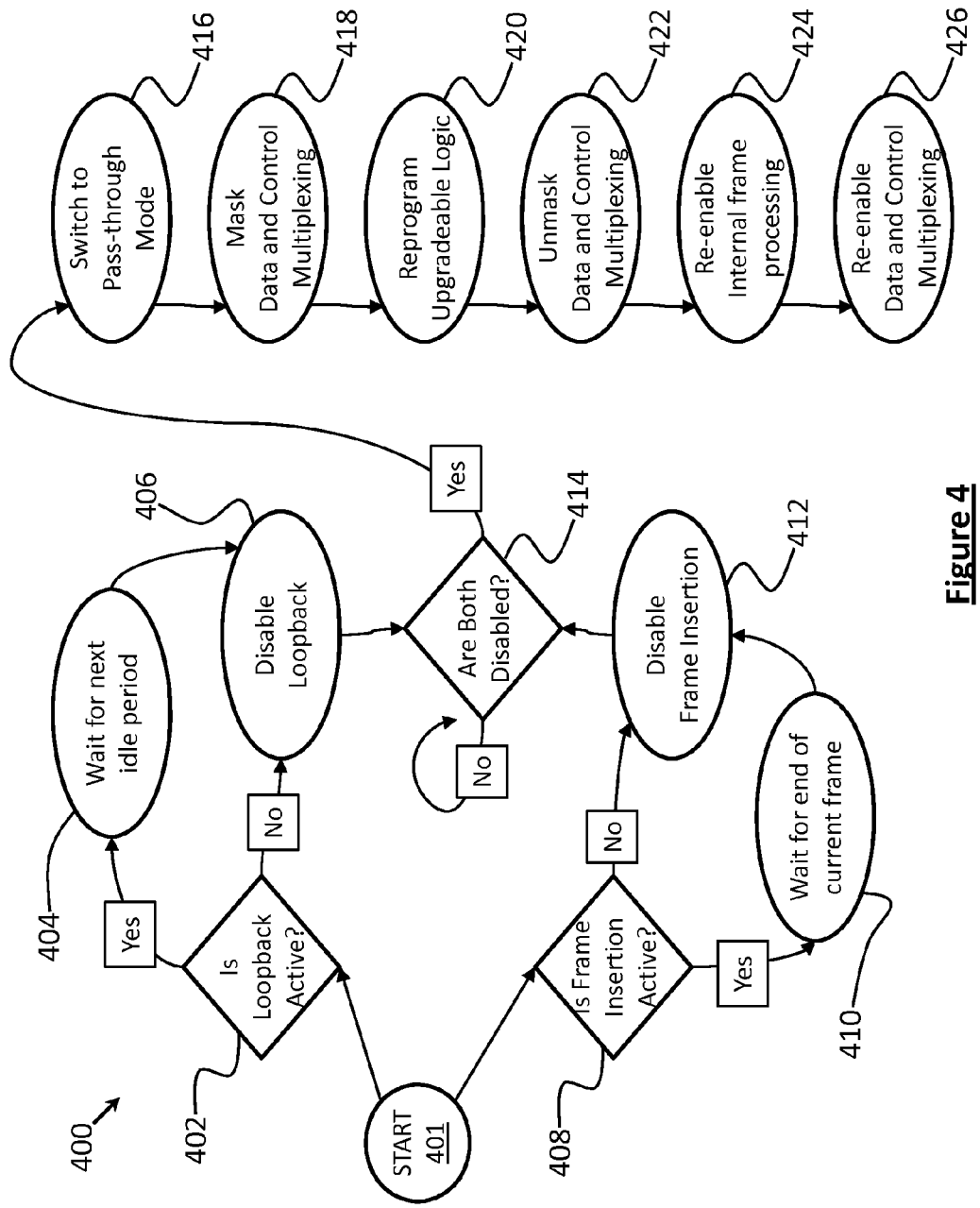
FIG. 4 is a logical flow diagram of a method of upgrading an internal logic of a programmable pluggable transceiver according to the present disclosure.

Referring now to FIGS. 3 and 4, a partial upgrade or method 400 for upgrading the upgradeable internal logic 304 is now described in greater detail. The control logic 301 includes Upgrade Frame Processing 310. Upgrade Frame Processing 310 monitors incoming data on one or both datapaths 16, 18 for frames (which includes data on two-wire host-controlled datapaths) related to upgrading the Upgradeable Internal Logic 304. Incoming frames marked or tagged for upgrades are processed and terminated by the Upgrade Frame Processing 310. The payload of these frames is extracted and may contain commands such as triggers for a full or partial upgrade, upgrade data, locations to download upgrade data, security credentials, handshaking commands such as acknowledgment and request signals, and the like.

When the Upgrade Frame Processing 310 receives upgrade data, it stores the data in memory 314 which is contained in the transceiver 300. When the Upgrade Frame Processing 310 receives the location from which to download upgrade data, it schedules download of upgrade data from that location through the transceiver 300. When the Upgrade Frame Processing 310 receives a command to trigger a partial or a full upgrade, it may verify that the memory 314 contains the complete upgrade data 313 and verify that the proper security clearances and authorizations have been acquired to perform the upgrade before informing Upgrade Logic 312 to commence the upgrade.

When a partial upgrade is triggered 401, the Upgrade Logic 312 sets 418 the mask signal 320 on the selection signal line to effectively disconnect the Upgradeable Internal Logic 304 from sending data or selection signals 303 to the multiplexer logic 26, 28 of the connectivity logic. In some embodiments, immediately disconnecting the Upgradeable Internal Logic 304, may be permitted; however, the Upgradeable Internal Logic 304 may be in the middle of outputting frames or other data, for example looping-back frames or inserting frames into one or both of the datapaths 16, 18.

Accordingly, in some embodiments, when the Upgrade Logic 312 receives a command from the Upgrade Frame Processing 310 to trigger 401 a partial upgrade, the Upgrade Logic 312 may determine 402 if the Upgradeable Internal Logic has loopback currently active on one of the datapaths, and if not, loopback can be immediately disabled 406, but if loopback is active, the Upgrade Logic 312 waits 404 until the first possible idle period in loopback activity then disables loopback. The Upgrade Logic 312 also determines 408 if the Upgradeable Internal Logic 304 is currently inserting frames such as control frames or other frames. If so, the Upgradeable Logic 312 waits 410 until frame insertion completes, then disables 412 the frame generation process. Other data output scenarios than just looping back frames and frame insertion are also possible given that the Upgradeable Internal Logic 304 may perform any different functions that can be programmed into it.

Instead of waiting 404 for the next idle period or waiting 410 for the end of the current frame, the method 400 may cleanly abort the activity of the Upgradeable Internal Logic 304. Cleanly aborting a currently outputting frame of the Upgradeable Internal Logic 304 includes appending a bad checksum to the last portion of the currently outputting frame so that the recipient drops the frame. In some embodiments, the decision between waiting 404, 410 and cleanly aborting the currently outputting frame is determined based on the relative importance of the currently outputting frame. If the currently outputting frame is of greater importance, the Upgrade Logic 312 may wait 404, 410. If the currently outputting frame is of less importance, the upgrade logic 312 may cleanly abort. For example, a loopback frame that is part of a test that will shortly be interrupted would be low importance and cleanly aborted; however, a modified service frame would be of higher importance and could cause the Upgrade Logic 312 to wait.

Once all data output scenarios from the Upgradeable Internal Logic 304 have been disabled 414, the isolating of the Upgradeable Internal Logic 304 by blocking or disconnecting it may proceed.

When all forms of data output from the Upgradeable Internal Logic 304 have been safely concluded 414, the Upgrade Logic 312 sets 416 the selection signals 303 to switch the multiplexer logic 26, 28 to "pass-through" mode to re-enable frame forwarding with the next buffered or incoming frame to the transceiver 300. In a simple sense, "pass-through" mode means the transceiver will operate as an ordinary transceiver without any of its additional functionality from the Upgradeable Internal Logic 304; however, the "pass-through" mode may also permit frames and data from the control logic to be transmitted on the datapaths 16, 18.

If the Upgradeable Internal Logic 304 was not outputting data when the partial upgrade was triggered, the connectivity logic 26, 28 may already be in a frame forwarding mode equivalent to "pass-through" mode. Now that the Upgrade Logic 312 has confirmed the Upgradeable Internal Logic 304 is not trying to output any frames, the Upgradeable Internal Logic 304 may be isolated by driving 418 the mask signal 320 masking the data and selection signals 303 from the Upgradeable Internal Logic 304 and effectively disconnecting and isolating the Upgradeable Internal Logic 304 at the logic gates 316, 318. In this manner, the Upgrade Logic 312 has disconnected the Upgradeable Internal Logic 304 from the core logic. Accordingly, the core logic may continue to operate unhindered by the partial upgrade reprogramming that will be applied to the Upgradeable Internal Logic 304.

After isolating the Upgradeable Internal Logic 304, the Upgrade Logic 312 reprograms 420 the Upgradeable Internal Logic 304 using the upgrade data 313 stored in memory 314, such as a reconfiguration file or an image. The Upgrade Logic 312 points to the upgrade data 313 in the memory 314 and triggers an upgrade in the programmable logic gate array 302. The programmable logic gate array 302 reprograms the Upgradeable Internal Logic 304 according to the upgrade data 313.

In some embodiments, the programmable logic gate array 302 provides feedback on whether or not the partial upgrade was successful or if an error occurred. For example, some programmable logic gate arrays have status registers to report about the upgrade process and embedded backup-and-revert functionality in case an upgrade fails. If the programmable logic gate array 302 detects that a reconfiguration error or other problem occurred while it was upgrading, the programmable logic gate array 302 may automatically revert the upgrading to a backup image. The backup image may be a default, initial or known good configuration of the Upgradeable Internal Logic 304, a copy made immediately prior to triggering the partial upgrade or some other image of the Upgradeable Internal Logic 304 stored in memory 314.

Where the programmable logic gate array 302 can report on the status of the upgrade but does not include this backup-and-revert functionality, the Upgrade Logic 312 may monitor the upgrade status and if a problem is detected, trigger another reprogramming from a newly selected upgrade data corresponding to the default, initial, known good configuration or other image. Alternatively, when a problem is detected during the upgrading, the transceiver may simply continue to operate in "pass-through" mode and the Upgrade Logic 312 may send a message or otherwise indicate the problem and may disable the Upgradeable Internal Logic 304.

When the Upgrade Logic 312 determines the upgrade process completed successfully, the mask signal 320 may be removed 422 and/or internal frame processing may be re-enabled 424 reconnecting the reprogrammed Upgradeable Internal Logic 304 to the core logic. The reprogrammed Upgradeable Internal Logic 304 may again control 426 the selection signals 303 and transmit data on either datapath 16, 18.

Embodiments of the present disclosure use specific sequencing and logic partitioning to upgrade a programmable pluggable transceiver's logic gate array without affecting traffic. The control logic specifically sequences disconnecting, upgrading and reconnecting the Upgradeable Internal Logic 304 so that the core logic may operate unaffected by the partial upgrade. Logic partitioning permits the core logic to remain operational, unchanged and unaffected by the upgrading of the Upgradeable Internal Logic 304. Remote upgrade may also be adapted in embodiments of the present disclosure to use an existing Ethernet channel to carry upgrade data and commands for the control logic instead of using a dedicated programming mechanism.

The datapaths 16, 18 may also include host-controlled datapaths such as two-wire interface lines described in the MSA specification for SFPs for exchanging information through a host port to read and/or write data into the programmable logic gate array 302, albeit, at slower speeds than the in-band datapaths. Two-wire host interfaces include the i$^2$C bus interface (i$^2$C bus trade-marked by NXP Semiconductors).

Where the features of the present disclosure have been described in respect of the two datapaths 16, 18, it is readily understood that the features of the present disclosure may equally be applied to a transceiver having only one datapath or having more than two datapaths (such as transceiver 8).

The memory 314 stores upgrade data 313 and may include previous, back-up, default or other images or configurations for full upgrades of the programmable logic gate array 302 or partial upgrades of the Upgradeable Internal Logic 304. The memory 314 may comprise any rewriteable processor or logic array readable non-transient memory that can be stored within the mechanical constraints of a programmable pluggable transceiver. In some embodiments, the memory 314 may form part of the logic gate array 302; however, it is generally more efficient for the memory to be external to the logic gate array 302. The memory 314 is connected to the Upgrade Frame Processing 310 to receive upgrade data 313 and to the Upgrade Logic 312 or directly to the Upgradeable Internal Logic 304 to reprogram the Upgradeable Internal Logic 304.

In one embodiment of the present disclosure, a pluggable transceiver for relaying frames in a packet based network is provided. The transceiver comprises a downstream data path for relaying frames in a first direction through the transceiver; an upstream data path for relaying frames in a second direction through the transceiver; and a reprogrammable logic gate array connected in-band through both the downstream and upstream data paths. The reprogrammable logic gate array for monitoring and testing the network from the pluggable transceiver using data loop back and control frame insertion. Upgrade frame processing logic is provided within the reprogrammable logic gate array and is connected in-band in the downstream and upstream data paths. The upgrade frame processing logic is provided for identifying and processing a frame containing full or partial upgrade information. A memory is also provided in the transceiver for storing the full or partial upgrade information. Upgrade logic within the reprogrammable logic gate array is connected to the frame processing logic and the memory for controlling full or partial upgrading of the reprogrammable logic gate array. The upgrade logic includes logic for: verifying the integrity of the full or partial upgrade information stored in the memory; isolating the reprogrammable logic gate array from the downstream and upstream data paths, including: disabling data loop back, if any is active; completing then disabling control frame insertion, if any is active; and switching output multiplexers on each of the downstream and upstream data paths to a pass-through mode. In response to isolating the reprogrammable logic gate array, the upgrade logic triggers partially upgrading the reprogrammable logic gate array from the partial upgrade information stored in the memory. In response to partially upgrading the reprogrammable logic gate array, the upgrade logic reconnects the upgraded reprogrammable logic gate array to the downstream and upstream data paths including: re-enabling data loop back; re-enabling control frame insertion; and releasing the pass-through mode of the output multiplexers on each of the downstream and upstream data paths.

In some embodiments of the present disclosure, multiple upgradeable internal logic sections may be provided in the programmable logic gate array 302. The Upgrade Logic 312, could select one or several of the sections to upgrade while the other upgradeable internal logic sections are kept running.

In some embodiments of the present disclosure, the programmable logic gate array 302 is connected to the datapaths 16, 18 and not connected inline through the datapaths 16, 18. Accordingly, the programmable logic gate array 302 may monitor or inspect traffic on the datapaths 16, 18. In such embodiments, the core logic of the transceiver 300 may remain in the programmable logic gate array 302 or it may be extracted from the programmable logic gate array 302 and, for example, be hardwired in the transceiver 300. Hardwiring the core logic is less advantageous because it cannot be upgraded by a full upgrade of the programmable logic gate array 302; however it is advantageous because it cannot be corrupted by any upgrade of the internal logic.

Where features of the present disclosure have been described as different embodiments, it is understood that a single embodiment may combine any number of these features unless the present disclosure indicates otherwise.

We claim:

1. A programmable pluggable transceiver for use in a network element of a network, the transceiver comprising:
   a datapath for relaying frames through the transceiver;
   a memory for storing upgrade data;
   a programmable logic gate array connected through the datapath, connected to the memory, and comprising internal logic, core logic, connectivity logic and control logic;
   the internal logic partitioned from the core logic, connectivity logic and control logic in the programmable logic gate array for upgrading the internal logic while the core logic, control logic and connectivity logic remain operational;
   the internal logic, core logic, and control logic each connected to the datapath for receiving and processing different frames;
   the internal logic connected to the connectivity logic via the control logic for, except during a partial upgrade, sending frames on the datapath and sending selection signals to the connectivity logic;

the core logic connected to the connectivity logic for forwarding frames through the datapath in accordance with a minimum throughput requirement;

the connectivity logic connected to the core logic and the control logic for receiving frames on the datapath and sending those frames on the datapath in accordance with the selection signal received from the control logic;

the control logic connected to the internal logic for receiving frames and selection signals from the internal logic;

the control logic connected to the connectivity logic for sending frames and selection signals received from the internal logic, except during a partial upgrade;

the control logic, in response to receiving a frame on the datapath containing upgrade data, sending the upgrade data to the memory;

the control logic, in response to receiving a frame on the datapaths containing a partial upgrade command:
- blocking the internal logic from sending frames or selection signals to the connectivity logic before and during the partial upgrade,
- triggering upgrade of the internal logic from upgrade data in the memory while the core logic, connectivity logic and control logic remain operational during the partial upgrade, and
- unblocking the internal logic from sending frames or selection signals to the connectivity logic after the partial upgrade.

2. The programmable pluggable transceiver of claim 1 wherein the core logic and the connectivity logic relay frames through the transceiver on the datapath while the control logic responds to the partial upgrade command.

3. The programmable pluggable transceiver of claim 1 wherein the control logic comprises logic gates and mask signals for blocking the frames and selection signals from the internal logic thereby blocking the internal logic's frames and selection signals from reaching the connectivity logic.

4. The programmable pluggable transceiver of claim 1 wherein the control logic further comprises upgrade frame processing logic and upgrade logic;
- the upgrade frame processing logic for receiving frames on the datapath including frames containing upgrade data to be stored in the memory and frames containing partial upgrade commands to be forwarded to the upgrade logic;
- the upgrade logic for isolating and triggering upgrade of the internal logic.

5. The programmable pluggable transceiver of claim 4 wherein the upgrade logic comprises further logic for determining if the internal logic is inserting frames on the datapath when the control logic receives a partial upgrade command, and if so, concluding the frame inserting before blocking the internal logic from sending frames or selection signals
- wherein concluding the frame inserting comprises any of:
  - waiting for an idle period after the currently inserting frames;
  - waiting for the currently inserting frames to complete insertion; and
  - aborting the currently inserting frames by invalidating a checksum of the current frame and stopping further frame insertion.

6. The programmable pluggable transceiver of claim 5 wherein the upgrade logic unblocking the internal logic from sending frames or selection signals to the connectivity logic after the partial upgrade further comprises logic for re-enabling frame inserting in the internal logic.

7. The programmable pluggable transceiver of claim 1 further comprising:
- a second datapath for relaying frames through the transceiver in a different direction than the datapath;
- the internal logic including loopback logic for filtering frames from one of the datapath and the second datapath and sending the frames back on the other of the datapath and the second datapath.

8. The programmable pluggable transceiver of claim 1 wherein the control logic comprises further logic for authenticating the partial upgrade command before upgrading the internal logic.

9. The programmable pluggable transceiver of claim 1 wherein the control logic comprises further logic for verifying an encryption of the frame containing upgrade data before sending the upgrade data to the memory.

10. The programmable pluggable transceiver of claim 1 wherein the control logic blocking the internal logic from sending frames or selection signals to the connectivity logic before and during the partial upgrade comprises further logic for switching the connectivity logic to a pass-through mode; and
- unblocking the internal logic from sending frames or selection signals to the connectivity logic after the partial upgrade comprises further logic for releasing the connectivity logic from the pass-through mode.

11. A method for partially upgrading a programmable pluggable transceiver in service in a network, the transceiver having a datapath for relaying frames through the transceiver, a programmable logic gate array connected through the datapath and a memory connected to the programmable logic gate array, the programmable logic gate array including upgradeable internal logic, core logic, connectivity logic and control logic, the internal logic, core logic and control logic connected to the datapath for receiving and processing different frames, the core logic and control logic each connected to the connectivity logic for sending frames to be sent on the datapath, the connectivity logic receiving frames from the core logic and the control logic on the datapath and sending those frame on the datapath in accordance with a selection signal from the control logic, the core logic for forwarding frames on the datapath in accordance with a minimum throughput requirement, the internal logic connected to the control logic for forwarding frames and selection signals to the connectivity logic, except during a partial upgrade, the control logic for isolating and triggering upgrade of the internal logic while the core logic, connectivity logic and control logic remain operational during the partial upgrade, the method comprising:
- partitioning the internal logic separately from the core logic, connectivity logic and control logic for upgrading the internal logic while the core logic, control logic and connectivity logic remain operational;
- providing upgrade data in the memory;
- receiving, in the control logic, a frame containing a partial upgrade command, and in response, the control logic:
  - blocking the internal logic from sending frames or selection signals to the connectivity logic;
  - after the blocking, triggering reprogramming of the internal logic from the upgrade data in the memory while the core logic, connectivity logic and control logic remain operational; and
  - after the reprogramming, unblocking the internal logic from sending frames or selection signals to the connectivity logic.

12. The method of claim 11 further comprising relaying frames through the transceiver via the core logic and the connectivity logic, on the datapath during the blocking, the reprogramming and the unblocking.

13. The method of claim 11 wherein blocking the internal logic from sending frames or selection signals to the connectivity logic further comprises:
   masking, in the control logic, the frames and selection signals from the internal logic thereby blocking the internal logic's frames and selection signals from reaching the connectivity logic.

14. The method of claim 11 further comprising:
   receiving, in the control logic, a frame containing upgrade data and in response, storing the upgrade data in the memory; and
   receiving, in the control logic, a frame containing a partial upgrade command and in response, isolating the internal logic then triggering upgrade of the internal logic.

15. The method of claim 11 further comprising: in response to receiving, in the control logic, a frame containing a partial upgrade command, determining if the internal logic is inserting frames on the datapath, and if so, concluding inserting frames before the blocking;
   wherein concluding inserting frames comprises any of:
      waiting for an idle period after the currently inserting frames;
      waiting for the currently inserting frames to complete insertion; and
      aborting the currently inserting frames by invalidating a checksum of the current frame and stopping further frame insertion.

16. The method of claim 15 wherein the unblocking further comprises re-enabling frame inserting in the internal logic.

17. The method of claim 11 further comprising:
   providing a second datapath for relaying frames through the transceiver in a different direction than the datapath;
   filtering, in the internal logic, frames from one of the datapath and the second datapath and sending the filtered frames back on the other of the datapath and the second datapath.

18. The method of claim 11 further comprising in response to receiving, in the control logic, a frame containing a partial upgrade command, authenticating the partial upgrade command before the blocking.

19. The method of claim 11 further comprising in response to receiving, in the control logic, a frame containing upgrade data, verifying an encryption of the frame containing upgrade data.

20. The method of claim 11 wherein the blocking further comprises switching the connectivity logic to a pass-through mode; and the unblocking further comprises releasing the connectivity logic from the pass-through mode.

* * * * *